United States Patent [19]
Haeg

[11] Patent Number: 4,981,034
[45] Date of Patent: Jan. 1, 1991

[54] TIRE EMULATOR FOR ROAD SIMULATORS

[75] Inventor: Steven R. Haeg, Shorewood, Minn.

[73] Assignee: MTS Systems Corporation, Eden Prairie, Minn.

[21] Appl. No.: 517,243

[22] Filed: May 1, 1990

[51] Int. Cl.$^5$ ............................................. G01M 19/00
[52] U.S. Cl. ....................................... 73/118.1; 73/669
[58] Field of Search ................... 73/118.1, 865.6, 669, 73/11

[56] References Cited

U.S. PATENT DOCUMENTS

| | | | |
|---|---|---|---|
| 3,713,330 | 1/1973 | Lentz | 73/93 |
| 3,718,033 | 2/1973 | Petersen | 73/71.7 |
| 3,821,893 | 7/1974 | Klinger et al. | 73/118 |
| 4,479,382 | 10/1984 | Greenhorn et al. | 73/146 |
| 4,501,139 | 2/1985 | Petersen | 73/118 |
| 4,658,656 | 4/1987 | Haeg | 73/669 |
| 4,733,558 | 3/1988 | Grenier | 73/118.1 |

FOREIGN PATENT DOCUMENTS 1232372 1/1967 Fed. Rep. of Germany .......... 73/11

OTHER PUBLICATIONS

Nolan, S. A., Linden, N. A., "Integrating Simulation Technology into Automotive Design Evaluation and Validation Processes", *MTS Systems Corporation*, SAE No. 871941, Oct. 1987, pp. 1–11.

Cripe, Ronald A., "Making a Road Simulator Simulate", *Chevrolet Motor Division, General Motors Corporation*, SAE No. 720095, Jan. 1972, pp. 1–12.

*Primary Examiner*—Jerry W. Myracle
*Attorney, Agent, or Firm*—Kinney & Lange

[57] ABSTRACT

A mechanical tire emulator for spindle coupled road simulators. It simulates the real case tire impedance characteristics, including wheel hop, between the servo actuator produced vertical road input motion and the vehicle spindle. By simulating the loading impedance of the tire using a fluid pressure actuator loading through a compressible fluid cushion and substituting this actuator device for the rigid vertical link on prior art spindle coupled road simulators, the overall mounting arrangement is simplified over that when a tire itself is mounted on a wheel for such testing.

19 Claims, 3 Drawing Sheets

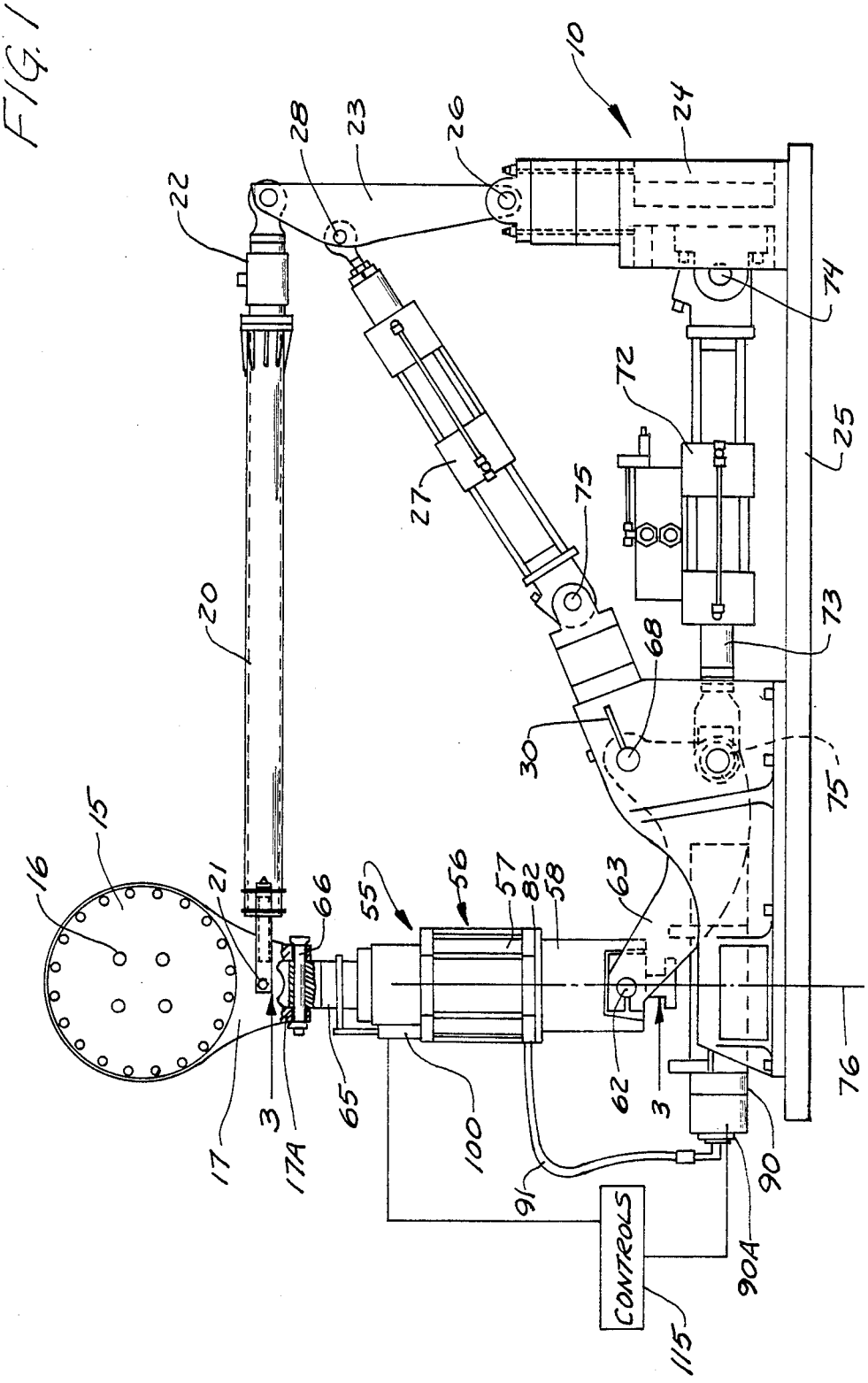

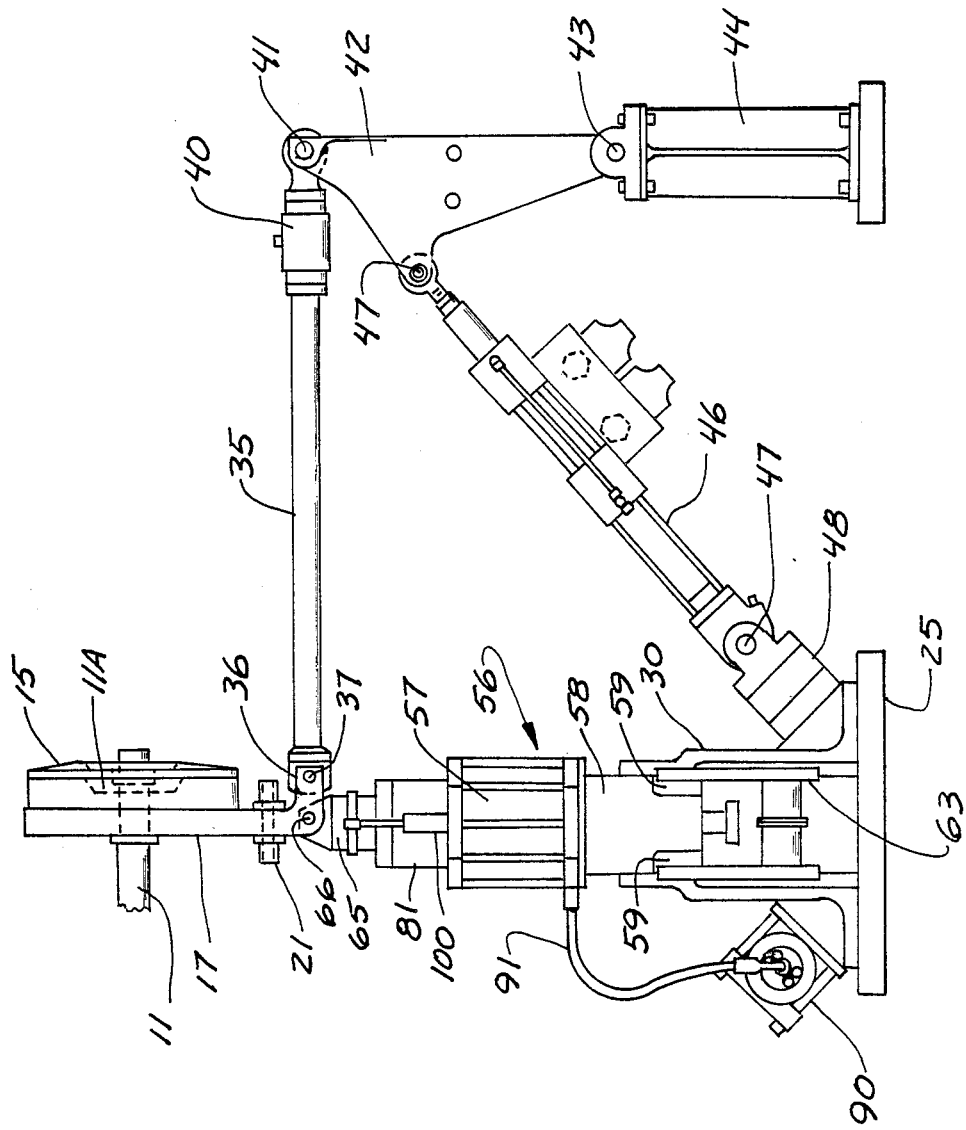

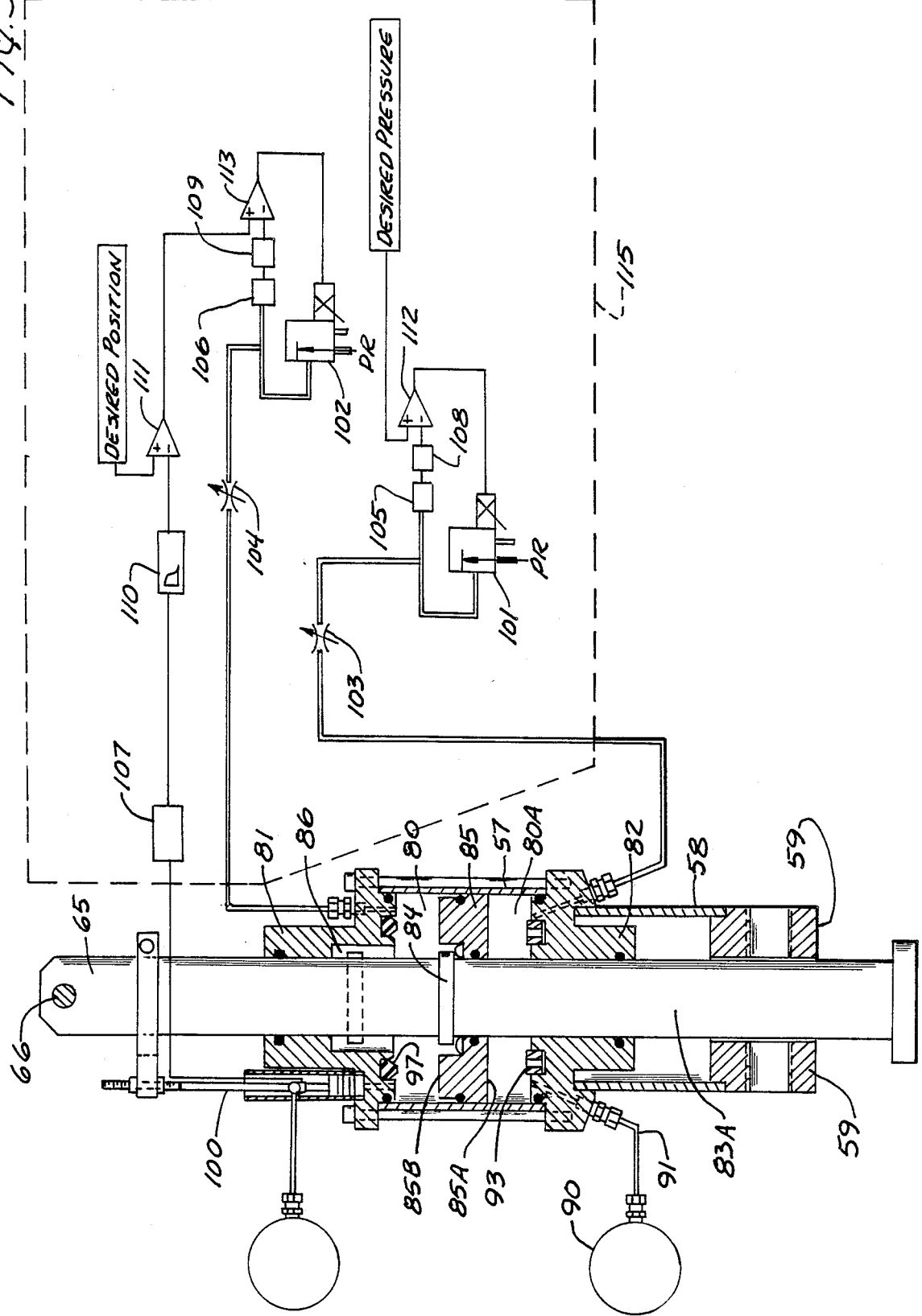

4,981,034

TIRE EMULATOR FOR ROAD SIMULATORS

BACKGROUND OF THE INVENTION

The present invention relates to a tire emulator which reproduces the effect of a rolling pneumatic tire on the vertical input to a vehicle spindle on spindle coupled road simulators.

U.S. Pat. No. 4,658,656 illustrates a multiple axis test machine that reproduces road excited vehicle vibrations. An actual pneumatic tire is mounted to provide simulated loading, including "wheel hop" phenomenon. The loads from road travel onto a test vehicle spindle can thus be reproduced.

U.S. Pat. No. 3,713,330 illustrates a simplified multiple axis test machine with a rigid vertical link transmitting the simulated vertical road input to the spindle of the vehicle.

The present device comprises a tire emulator that replaces the pneumatic tire of U.S. Pat. No. 4,658,656 and provides a simple direct replacement of the vertical link of U.S. Pat. No. 3,713,330.

The importance of tire emulation in road simulation is described in an article entitled "Integrating Simulation Technology into Automotive Design and Validation Processes" by Stephen A. Nolan and Nigel A. Linden (SAE Technical paper No. 871941, 1987). This invention adds in a simple manner the advantages of a tire coupled simulator to the advantages of a spindle coupled simulator. In particular, it allows for dynamic response changes (as provided by the tire in the real case) due to suspension component variations during the test and it requires less power on the power intensive vertical input simulation. It simulates the real case "wheel hop" and "rim strike" dynamic vertical load input changes. Additionally, through manual or automatic control adjustments, it emulates the characteristics of a rolling tire which are different than a static tire.

SUMMARY OF THE INVENTION

The present invention relates to a tire emulator apparatus that is mechanically inserted in the vertical loading link of prior art spindle coupled road simulators such as that of U.S. Pat. No. 3,713,330. The emulator has a form similar to a double rod ended air cylinder with one part pivotally connected to the servo actuator producing the simulated vertical road input motion and the second part is pivotally connected to a specimen adapter. The air cylinder is modified to have a free-floating piston that transmits force to the output rod in one (first) direction only and the rod free travels for a selected distance to a mechanical stop in the first direction after the piston has contacted a mechanical stop as it is moving in the first direction. The free travel of the rod after the piston contacts the mechanical stop emulates wheel hop. The piston travels in a second direction to an adjustable stop that simulates the "rim strike" dynamics on the vertical input.

Separate means are provided to manually or automatically adjust the air pressure on each side of the piston in such a manner to simulate the compliance of a rolling pneumatic tire and to locate the neutral position of the piston in the air cylinder such that wheel hop and rim strike occur at piston stroke positions and thus spindle positions that would occur in actual road travel. Additional air reservoir volume is added on each side of the piston as needed to achieve the simulation of actual conditions.

In the case where automatic programmed control of the emulated tire compliance and piston neutral position is provided, suitable flow control orifices and an electronic filter circuit smoothes (filters) out the cyclic air pressure and cyclic displacement feedback signals, respectively, to permit closed loop control of the average or mean value of said parameters.

The tire emulator provides the function of the tire in U.S. Pat. No. 4,658,656 with a simple compact device and adds the capability of programming the tire compliance to emulate the compliance of a rolling pneumatic tire.

BRIEF DESCRIPTION OF THE DRAWINGS

FIG. 1 is a side elevational view of a typical test apparatus including a tire emulator fluid actuator made according to the present invention;

FIG. 2 is a front elevational view of the device in FIG. 1; and

FIG. 3 is a part schematic and sectional view showing an actuator used in FIG. 1 with controls attached.

DETAILED DESCRIPTION OF THE PREFERRED EMBODIMENTS

Reference to the general testing arrangement used with this type of loading device is made to U.S. Pat. No. 4,658,656, and to U.S. Pat. No. 3,713,330 issued January 1973 to Thomas Lenz.

Schematically shown in FIG. 1 is a test apparatus 10 that loads a spindle of a test vehicle indicated schematically at 11 in FIG. 2. The spindle is supported in an actual vehicle so it can travel a substantial distance in vertical direction. The test apparatus includes a spindle adapter indicated generally at 15 which permits applying loads to the spindle through a wheel hub that would be fastened to the interior of the spindle adapter through bolts 16. The spindle adapter includes a loading neck 17 that is provided with various linkages for loading the unit in locations that substantially simulate the load applied at the tire patch radius of a vehicle tire. The loading linkage includes a longitudinal force input link 20 that has an attachment pivot point 21 to the bracket 17, and which is loaded through a load cell 22 from a bellcrank 23 mounted on a frame 24 supported on a test base 25 in a normal manner. The bellcrank 23 is pivotally mounted as at 26 to the support 24, and is loaded through an actuator assembly 27 that has its rod end connected as at 28 to the bellcrank. The actuator 27 has a base end connected as at 29 to a support 30 supported back to the test base 25.

A lateral load input link is shown in FIG. 2, and is indicated at 35. The lateral load input link 35 is connected to the brackets 17 through a pair of ears 36, and a pin 37 at the tire patch radius from the spindle. The lateral load link 35 is loaded through a load cell 40 from a pivot pin 41 connected to a bellcrank 42. The bellcrank 42 in turn is connected through a pivot pin 43 to a support 44 that is connected to the test base 25 in a suitable manner. A lateral load actuator 46 has its rod end connected as at 47 to a portion of the bellcrank 42, and upon selected extension and retraction of the actuator rod the bellcrank will be pivoted to load the link 35 and apply lateral load on the test adapter, simulating loads on a tire during use of the vehicle.

The base end of the actuator 46 is connected as at 47 to a bracket 48 that is formed as a part of the base bracket 30. The bracket 48 is thus supported back to the frame or test base 25.

Both the longitudinal and lateral actuators are controlled by a suitable control system to provide programmed input loads in a normal manner. Feedback is provided from the load cells so that the program load is applied through suitable valves connected to the actuators.

The vertical loading on the spindle is applied in a manner that is well known, but is applied through the tire emulator of the present invention, which is interposed between the bracket 17 and the vertical loading bellcrank. The tire emulator indicated generally at 55 is in effect a fluid pressure actuator loading link or member that has a fluid cushion for transferring loads to the spindle, as well as stops that provide the necessary simulation of loading through the wheel rim and a collapsed portion of the sidewall of the tire, as sometimes will occur during use.

The tire emulator 55 includes a pneumatic actuator 56 that has an outer cylinder housing 57 that is loaded through a coupling sleeve 58 from trunnion 59 that is mounted to the coupling sleeve 58. The trunnion 59 and sleeve 58 are loaded through suitable pivot pins 62 from a vertical loading bellcrank 63. The outer cylinder 57 acts on through an internal piston as will be shown, to load a rod assembly 65 that is operated through a piston connection. The rod assembly 65 is connected in turn through a pin 66 to trunnion 17A on the bracket 17 for providing vertical loading when the bellcrank actuator 63 is operated.

The bellcrank 63 is pivotally mounted as at 68 at a portion of the bracket 30, and is operated in a known manner through a servo controlled double acting actuator 72 that has a rod 73 connected through a pivot pin 74 to the bellcrank 63, as shown in dotted lines in FIG. 1, so that upon extension and retraction of the rod 73 the bellcrank will pivot about the pivot pin 68 and provide a vertical load generally along a vertically axis indicated at 76 that passes through the axis of the spindle.

The base end of the actuator 72 is connected with a pin 75 to the support 24 that also mounts the bellcrank 23 for the longitudinal load actuator.

Again, all the loading reactions are reacted to the base plate 25.

The tire emulator 55, as mentioned, is a pneumatic fluid pressure cylinder and piston actuator assembly 56 as shown generally in FIG. 3. The actuator includes an outer cylinder 57. The cylinder 57 has an interior chamber and end caps 81 and 82. The end caps 81 and 82 slidably guide and seal the rod assembly 65. The rod assembly 65 has a collar or flange 84 fixed to the rod and positioned in the center portions thereof, and this flange 84 is used for mechanical loading connection in one direction with respect to a piston 85. The piston 85 slidably mounts on the rod 65 inside the cylinder 57 and it is sealed on the inside of the cylinder 57. The end cap 81 has a cavity or recess 86 therein that is of size to slidable receive the flange 84 when the rod 63 moves upwardly sufficiently. The lower portion of the rod 65 indicated at 83A, which is on the lower side of the flange 84, is slidable mounted through a bore in the piston 85, and is also slidable mounted through the end cap 82, including a neck portion thereof.

The coupling sleeve 58, as can be seen, is welded or otherwise securely fastened to the end cap 82, and surrounds the neck portion of the end cap as well as the lower portion 83A of the rod 65. The lower end of the sleeve 58 has trunnion 59, as shown for receiving the vertical load applying pivot pins 62.

The piston actuating chamber is indicated at 80A and forms a portion of the chamber 80 below the piston 85. This chamber 80A is connected to a suitable source of gaseous fluid under pressure, which can include an accumulator such as that indicated at 90, if desired. Suitable pressure controls and valves can be used for controlling the pressure in chambers 80 and 80A as will be shown in connection with FIG. 3. The actuator rod 65 can be hollow and serve the same purpose of providing extra volume for chamber 80.

The end cap 82 has a resilient bumper ring 93 mounted therein which aligns with the lower surface indicated at 85A of the piston 85. This will provide a cushioning effect if the load exerted by the bellcrank 63 forces the sleeve 58 and the end cap 82 quickly upward, to compress the fluid in the chamber 80A or if the pressure in chamber 80A is released or reduced. The resilient bumper ring 93 can provide a loading that simulates the situation where the tire would bottom out against the rim. The response can be changed by changing the shape and/or material of the shock absorbing bumper ring 93. Direct rim edge-road contact also can be simulated.

The end cap 81 has a stop bumper 97 positioned around the rod at the upper end of the chamber 80, which will engage the upper surface 85B of the piston 85, when the cylinder moves upwards rapidly and causes separation of collar 84 from piston 85 to simulate "wheel hop". The rod 65 and its lower end portion 83A will be free to slide relative to the piston 85 as the collar or flange 84 moves into the cavity 86 as shown in dotted lines.

The mean or average pressure in chamber 80A is controlled by pressure regulator 101 and is controlled in chamber 80 by pressure regulator 102. Orifices 103 and 104 smooth our pressure oscillations in chambers 80A and 80, respectively, such that pressure transducers 105 and 106 sense the mean pressure in chambers 80A and 80, respectively.

Programmed control of the tire emulator impedance characteristics is accomplished in the following manner. Displacement transducer 100 provides a signal through transducer conditioner 107 that is filtered by low pass filter 110 to displacement controller 111. The output of controller 111 represents a signal proportional to the desired pressure in chamber 80 to achieve the desired mean, or reference position of rod 65. Pressure transducers 105 and 106 are shown schematically in the circuit and sense pressure provided to chambers 80 and 80A. Transducer conditioners 108 and 109 convert the pressure signals from transducers 105 and 106 representing the pressure in chambers 80A and 80 to proportional electrical signals for feedback input to valve controllers 112 and 113, respectively. The valve controllers control valves 101 and 102. The desired pressure in chamber 80A is commanded as a signal to controller 112. The desired position of the rod 65 is provided as an input signal to controller 111. Controllers 111 and 113 then control pressure in chamber 80 to achieve the desired mean position of rod 65.

Manual control of the tire emulator impedance is accomplished by using manual regulators with pressure gauges substituted for the regulators at 101 and 102. No electronic controls are needed. The desired mean pressure in 80A is manually adjusted at regulator 101. The desired mean position of rod 65 is set by manually adjusting regulator 102.

What is claimed is:

1. A tire simulating load link for a spindle coupled load simulator comprising a compressible fluid actuator assembly including a fluid cylinder, a piston mounted in said cylinder, a rod extending from said cylinder, means to provide fluid pressure in said cylinder on a side of said piston to transfer loads from a loading apparatus to the spindle through a compressed fluid cushion acting on the piston within the cylinder, said compressed fluid cushion being adjusted to simulate loading the spindle through a pneumatic tire.

2. The apparatus as specified in claim 1 wherein the actuator assembly is coupled to provide loads to the spindle through the actuator assembly in only one axial direction.

3. The apparatus as specified in claim 1 wherein the piston and piston rod are coupled for carrying loads in one axial direction only, the piston sliding relative to the rod and being stopped on the cylinder in a first position when the rod extends from the cylinder more than a desired amount.

4. The apparatus as specified in claim 3 and a resilient cushion providing a stop to support the piston relative to the cylinder in the piston's first position.

5. The apparatus as specified in claim 3, and means for limiting travel of the piston and rod relative to the cylinder in a second position to mechanically transfer load from the loading apparatus to the spindle.

6. The apparatus as specified in claim 1 wherein said piston and piston rod are slidably mounted relative to each other, and means to stop relative movement between the piston and piston rod in a first direction, said first direction being the direction of application of force from the fluid pressure cushion acting on the piston to the rod.

7. The apparatus as specified in claim 6, and stop means to limit movement of the piston and rod in the second opposite direction relative to the cylinder, said stop means including a resilient cushion member for simulating loading directly between a tire and a rim to the spindle.

8. The apparatus as specified in claim 7, and means on the cylinder to engage the piston when the piston moves the rod in said first direction to a selected first stop position, said rod being free to continue to move in said first direction relative to said cylinder when the piston has reached the first stop position.

9. The apparatus as specified in claim 1 wherein the compressible fluid actuator is a double ended rod actuator with a preset compressible fluid pressure on one side of the piston of magnitude to achieve the equivalent impedance of a rolling pneumatic tire, in combination with a preset compressible fluid pressure on the other side of said piston that locates said piston at a desired position within a stroke length of actuator.

10. The apparatus as specified in claim 9 wherein additional chamber volume is connected to a fluid chamber of said actuator to achieve the said equivalent impedance and desired piston position.

11. The apparatus as specified in claim 9 wherein a displacement sensing transducer is connected to said rod, and control apparatus coupled to the displacement transducer and the means to control pressure to automatically regulate the fluid pressure in one fluid chamber of said actuator formed by the piston and cylinder to maintain a desired piston displacement position during a vehicle simulation test.

12. A tire simulating load link for a wheel spindle coupled road simulator test assembly comprising a gaseous fluid actuator, said fluid actuator including a cylinder member, a piston slidably mounted in said cylinder member and being slidably sealed with respect to an interior of said cylinder member, and a rod coupled to said piston for generating loads in a first direction between the cylinder and the piston to apply loads in a first axial direction of the rod between a loading apparatus and a spindle to be tested, means to control the pressure transferring loads in the first direction of the rod between the cylinder and piston to establish a gaseous fluid cushion between portions of the cylinder and the piston, and means to limit movement of said cylinder and piston relative to each other in a second direction of the rod to provide a second stopped position of said piston, said rod being prevented from movement in said second direction relative to said piston beyond the second stopped position.

13. The apparatus as specified in claim 12 wherein said piston has a bore therethrough, and said rod is slidably mounted through said bore, and a collar on said rod to engage a portion of said piston to prevent travel of the rod relative to the piston in the second axial direction of the rod.

14. The apparatus as specified in claim 12 and resilient means to engage said piston when the piston is in its first stop position.

15. The apparatus as specified in claim 12 and valve means to control the pressure of the fluid cushion acting on the piston from a source of fluid under pressure.

16. The apparatus as specified in claim 12 wherein the coupling between the piston and the rod permits movement of said rod substantially unrestrained in said first axial direction of the rod relative to said piston.

17. The apparatus as specified in claim 12 wherein the fluid actuator is a double ended rod actuator having a stroke length, with a preset compressible fluid pressure on one side of the piston of magnitude to achieve the equivalent impedance of a rolling pneumatic tire in combination with a preset compressible fluid pressure on the other side of said piston that locates said piston at a desired position within the stroke length of said actuator.

18. The apparatus as specified in claim 12 and means forming additional chamber volume connected to a fluid chamber of said actuator formed between the piston and the cylinder member to achieve the said impedance and desired piston position.

19. The apparatus as specified in claim 12 and a displacement sensing transducer connected to said rod, and control apparatus connected to the displacement transducer and the means to control pressure to automatically regulate the fluid pressure in one fluid chamber of said actuator formed by the piston and cylinder member to maintain a desired piston displacement position during a vehicle simulation test.

* * * * *